(12) United States Patent
Sakamoto

(10) Patent No.: US 8,958,788 B2
(45) Date of Patent: Feb. 17, 2015

(54) HOME ELECTRONIC APPARATUS CONTROL SYSTEM, HOME ELECTRONIC CONTROL APPARATUS, AND WIRELESS HOME ELECTRONIC APPARATUS CONTROL TERMINAL

(75) Inventor: Kazuyuki Sakamoto, Minato-ku (JP)

(73) Assignee: NEC Corporation, Tokyo (JP)

(*) Notice: Subject to any disclaimer, the term of this patent is extended or adjusted under 35 U.S.C. 154(b) by 128 days.

(21) Appl. No.: 13/420,265

(22) Filed: Mar. 14, 2012

(65) Prior Publication Data

US 2012/0238259 A1 Sep. 20, 2012

(30) Foreign Application Priority Data

Mar. 18, 2011 (JP) ................... 2011-060598

(51) Int. Cl.
*H04M 3/00* (2006.01)
*H04L 12/28* (2006.01)

(52) U.S. Cl.
CPC ........ *H04L 12/2809* (2013.01); *H04L 12/2814* (2013.01); *H04L 12/282* (2013.01); *H04L 2012/2841* (2013.01)
USPC ............................ 455/420; 455/418; 455/419

(58) Field of Classification Search
CPC ............ H04M 1/72533; H04M 1/7253; H02L 12/2803; H04L 12/2809
USPC ................................................. 455/418–420
See application file for complete search history.

(56) References Cited

U.S. PATENT DOCUMENTS

| 7,562,128 B1 * | 7/2009 | Caris et al. ..................... 709/220 |
| 7,957,697 B2 * | 6/2011 | Park et al. .................... 455/41.2 |
| 8,180,373 B2 * | 5/2012 | de Clerq et al. ............ 455/456.1 |
| 2003/0011467 A1 | 1/2003 | Suomela |
| 2011/0302201 A1 * | 12/2011 | Ogaz et al. ..................... 707/769 |
| 2012/0086563 A1 * | 4/2012 | Arling et al. ................ 340/12.52 |
| 2013/0223279 A1 * | 8/2013 | Tinnakornsrisuphap et al. ............................. 370/254 |

FOREIGN PATENT DOCUMENTS

| JP | 2002-291061 A | 10/2002 | |
| JP | 2002291061 A | * 10/2002 | ............... H04Q 9/00 |
| JP | 2005-94457 A | 4/2005 | |
| JP | 2006-323596 A | 11/2006 | |
| JP | 2006-324922 A | 11/2006 | |
| JP | 2010-56922 A | 3/2010 | |
| JP | 2010-177796 A | 8/2010 | |

OTHER PUBLICATIONS

Communication dated Sep. 30, 2014, issued by the Japanese Patent Office in counterpart Japanese application No. 2011-060598.

* cited by examiner

*Primary Examiner* — Allahyar Kasraian
(74) *Attorney, Agent, or Firm* — Sughrue Mion, PLLC

(57) ABSTRACT

An electrical apparatus control system includes: a control apparatus that is connected to a control target electrical apparatus and functions as a small-sized base station; a wireless terminal that wirelessly connects to the control apparatus; and a server that holds target apparatus data including a list of control target electrical apparatuses set for each control apparatus. The wireless terminal acquires the target apparatus data set for the control apparatus from the server via the control apparatus, and transmits operation data for controlling a control target electrical apparatus, to the control apparatus on the basis of a performed operation. The control apparatus controls the control target electrical apparatus on the basis of the operation data received from the wireless terminal.

7 Claims, 8 Drawing Sheets

HOME ELECTRONIC APPARATUS CONTROL SYSTEM, HOME ELECTRONIC CONTROL APPARATUS, AND WIRELESS HOME ELECTRONIC APPARATUS CONTROL TERMINAL

This application is based upon and claims the benefit of priority from Japanese patent application No. 2011-060598, filed on Mar. 18, 2011, the disclosure of which is incorporated herein in its entirety by reference.

BACKGROUND OF THE INVENTION

1. Field of the Invention

The present invention relates to a technique for controlling an electrical apparatus.

2. Description of the Related Art

JP2002-291061A discloses a method for controlling multiple electrical apparatuses with a common small-sized general-purpose control terminal. The technique disclosed in JP2002-291061A is a technique for controlling multiple electrical apparatuses in a home by a mobile phone. Information such as a list of electrical apparatuses which can be controlled by a mobile phone is registered with a home appliances information management server. A user accesses the home appliances information management server via a mobile phone to acquire the list of electrical apparatuses, and selects and controls a desired electrical apparatus in the list. A control signal from the mobile phone is transmitted to the target electrical apparatus via a mimic base station installed in the home. The electrical apparatus operates in accordance with the control signal.

However, in the technique disclosed in JP2002-291061A, a mobile phone accesses the home appliances information management server via a public mobile phone base station. In controlling an electrical apparatus, the mobile phone is used mainly in a room. However, radio waves from the public mobile phone base station may sometimes be weak in a room. In such a case, it may happen that the mobile phone cannot acquire the list of electrical apparatuses which can be controlled by the mobile phone, and the like and, therefore, cannot control the electrical apparatus.

SUMMARY OF THE INVENTION

The object of the present invention is to provide a technique making it possible to stably control an electrical apparatus by a general-purpose control terminal even at a place where it is difficult for radio waves to reach.

In order to achieve the above object, an electrical apparatus control system of the present invention includes:

a control apparatus connected to a control target electrical apparatus and provided with a function to act as a small-sized wireless communication base station;

a wireless terminal that wirelessly connects to said control apparatus; and a server that holds target apparatus data including a list of control target electrical apparatuses set for each control apparatus; wherein said wireless terminal acquires the target apparatus data set for said control apparatus from said server via said control apparatus, and transmits operation data for controlling a control target electrical apparatus included in the list to said control apparatus on the basis of a performed operation; and said control apparatus controls the control target electrical apparatus on the basis of the operation data received from said wireless terminal.

In order to achieve the above object, a control apparatus of the present invention is a control apparatus connected to a control target electrical apparatus, the control apparatus including:

a base station function section that functions as a small-sized wireless communication base station and performs relay when a wireless terminal acquires from a server target apparatus data including a list of control target electrical apparatuses set for the control apparatus; and an electrical apparatus control section that receives from the wireless terminal operation data for controlling a control target electrical apparatus included in the list, and controls the control target electrical apparatus on the basis of the operation data.

In order to achieve the above object, a wireless terminal of the present invention includes:

a data acquisition section that wirelessly connects to a control apparatus provided with a control function for controlling a control target electrical apparatus and a function to act as a small-sized wireless communication base station and acquires target apparatus data including a list of control target electrical apparatuses set for the control apparatus, from a server via the control apparatus; and a data transmission section that transmits operation data for controlling a control target electrical apparatus included in the list to the control apparatus on the basis of a performed operation.

According to the present invention, it is possible to stably control an electrical apparatus by a general-purpose control terminal even at a place where it is difficult for radio waves to reach.

The above and other objects, features, and advantages of the present invention will become apparent from the following description with reference to the accompanying drawings which illustrate examples of the present invention.

DESCRIPTION OF THE PREFERRED EMBODIMENTS

A basic exemplary embodiment for practicing the present invention will be described in detail with reference to drawings.

Figure 1:
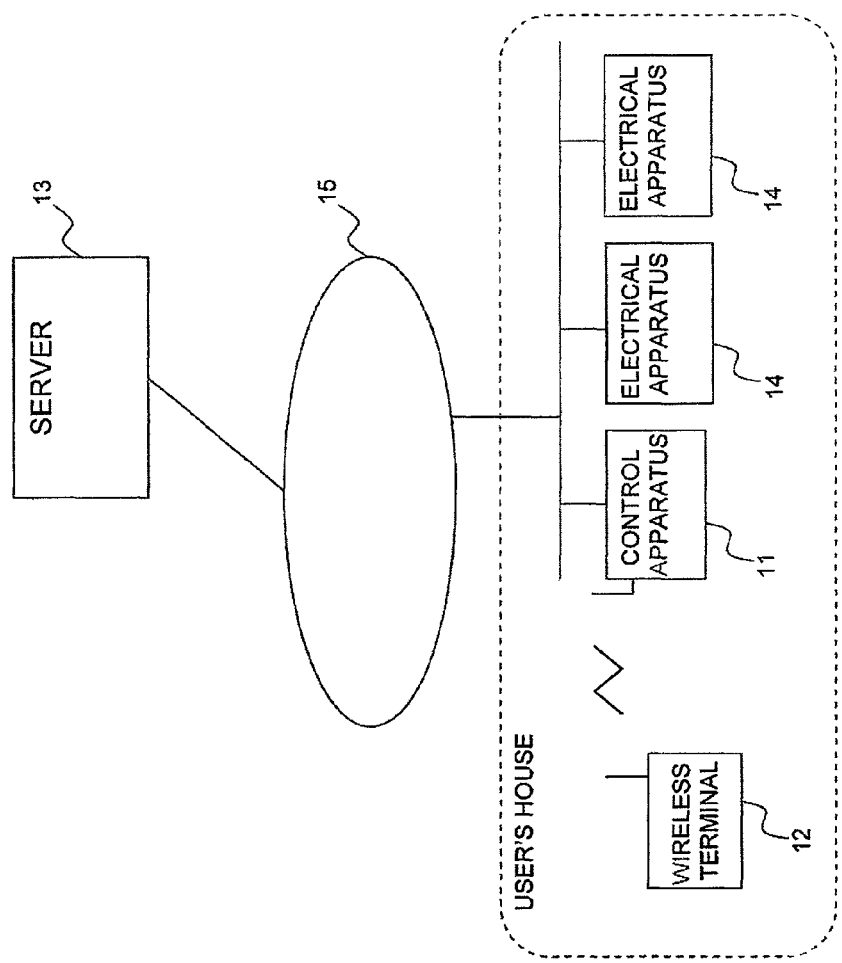
FIG. 1 is a block diagram showing a configuration of an electrical apparatus control system of this exemplary embodiment.

FIG. 1 is a block diagram showing a configuration of an electrical apparatus control system of this exemplary embodiment. Referring to FIG. 1, the electrical apparatus control system includes control apparatus 11, wireless terminal 12 and server 13.

Control apparatus 11 is installed in a user's house and connected to electrical apparatuses 14 in the house to be targeted for control. Control apparatus 11 and electrical apparatuses 14 may be connected via wire in the house, a wireless LAN (Local Area Network) or near field wireless communication such as infrared communication. Control apparatus 11 is also connected to network 15 such as the Internet and is provided with function to act as a small-sized mobile communication base station (femtocell).

Wireless terminal 12 is a terminal which the user operates to control electrical apparatuses 14, and it can wirelessly connect to control apparatus 11 which functions as a small-sized base station.

Server 13 is connected to network 15, and it holds target apparatus data including a list of control target electrical apparatuses set for control apparatus 11 in each user's house. For example, electrical apparatus 14 which is installed in a user's house where control apparatus 11 is installed and which is connected to control apparatus 11 such that it can be controlled from control apparatus 11 can be set for control apparatus 11 as a control target electrical apparatus.

Wireless terminal 12 connects to server 13 via control apparatus 11 and acquires target apparatus data set for control apparatus 11 from server 13. When the user performs an operation, wireless terminal 12 transmits operation data, for controlling a control target electrical apparatus included in the list in the target apparatus data, to control apparatus 11.

Control apparatus 11 controls the control target electrical apparatus on the basis of the operation data received from wireless terminal 12.

At that time, control apparatus 11 may transmit the operation data received from wireless terminal 12, to server 13. In this case, server 13 can accumulate the received operation data, associating the operation data with control apparatus 11. Furthermore, server 13 may transmit, together with the list set for control apparatus 11, assistance data for assisting the user who operates electrical apparatus 14 included in the list, the assistance data being determined on the basis of the operation data accumulated, being associated with control apparatus 11, by including the assistance data in the target apparatus data, to wireless terminal 12.

As described above, according to this exemplary embodiment, wireless terminal 12 acquires target apparatus data from server 13 via control apparatus 11 which functions as a small-sized base station, and transmits operation data to control apparatus 11 on the basis of an operation; and control apparatus 11 controls electrical apparatus 14 on the basis of the operation data. Thus, it is possible to stably control electrical apparatus 14 by general-purpose wireless terminal 12 in a room.

Figure 2:
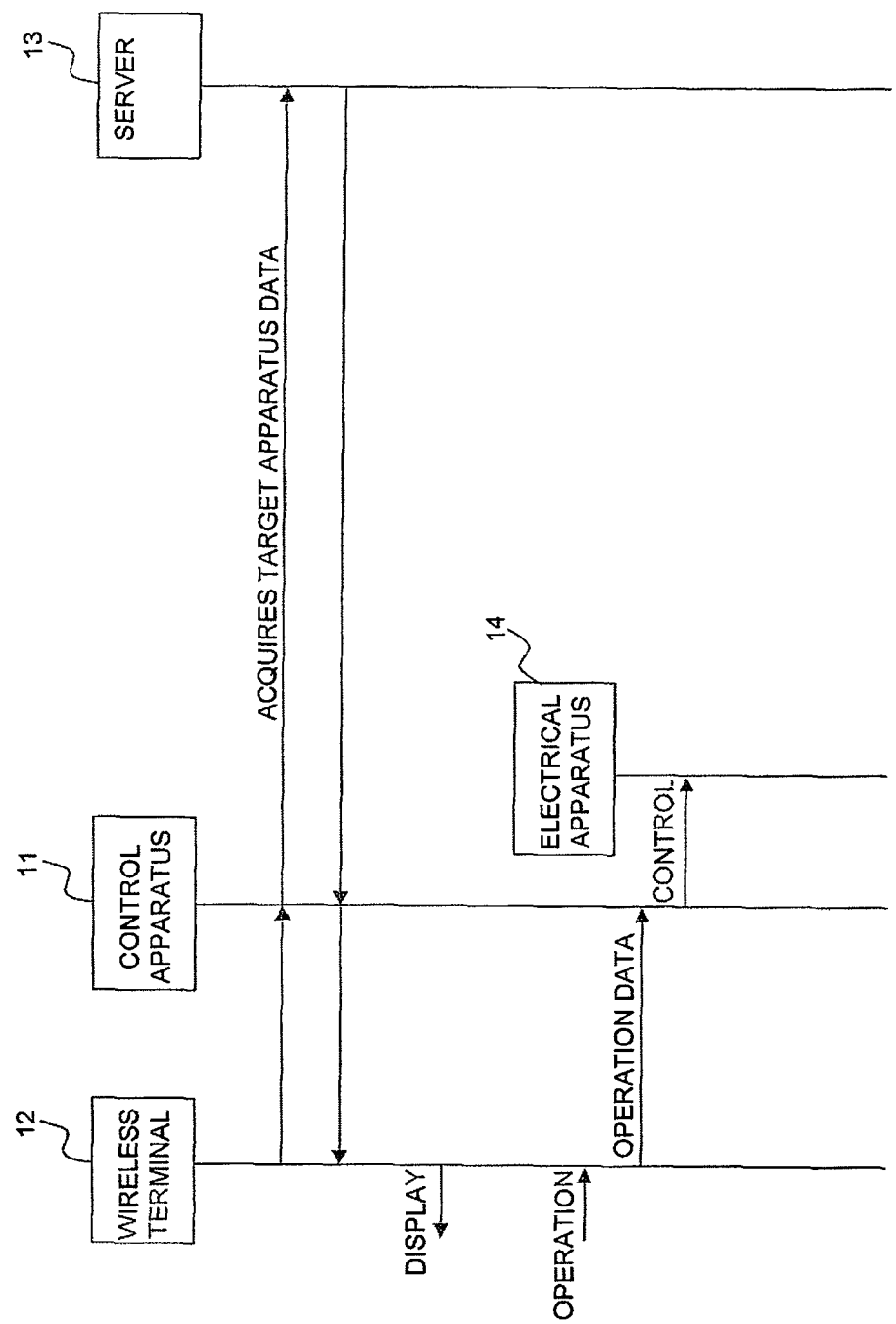
FIG. 2 is a sequence diagram showing an operation of the electrical apparatus control system of this exemplary embodiment.

FIG. 2 is a sequence diagram showing an operation of the electrical apparatus control system of this exemplary embodiment. Referring to FIG. 2, wireless terminal 12 acquires target apparatus data from server 13 via wireless communication with control apparatus 11 which functions as a small-sized base station first. Wireless terminal 12 performs display for a user operation on the basis of the target apparatus data. When the user performs an operation, wireless terminal 12 transmits operation data indicating the contents of the operation to control apparatus 11. Receiving the operation data, control apparatus 11 controls electrical apparatus 14 on the basis of the operation data.

Figure 3:
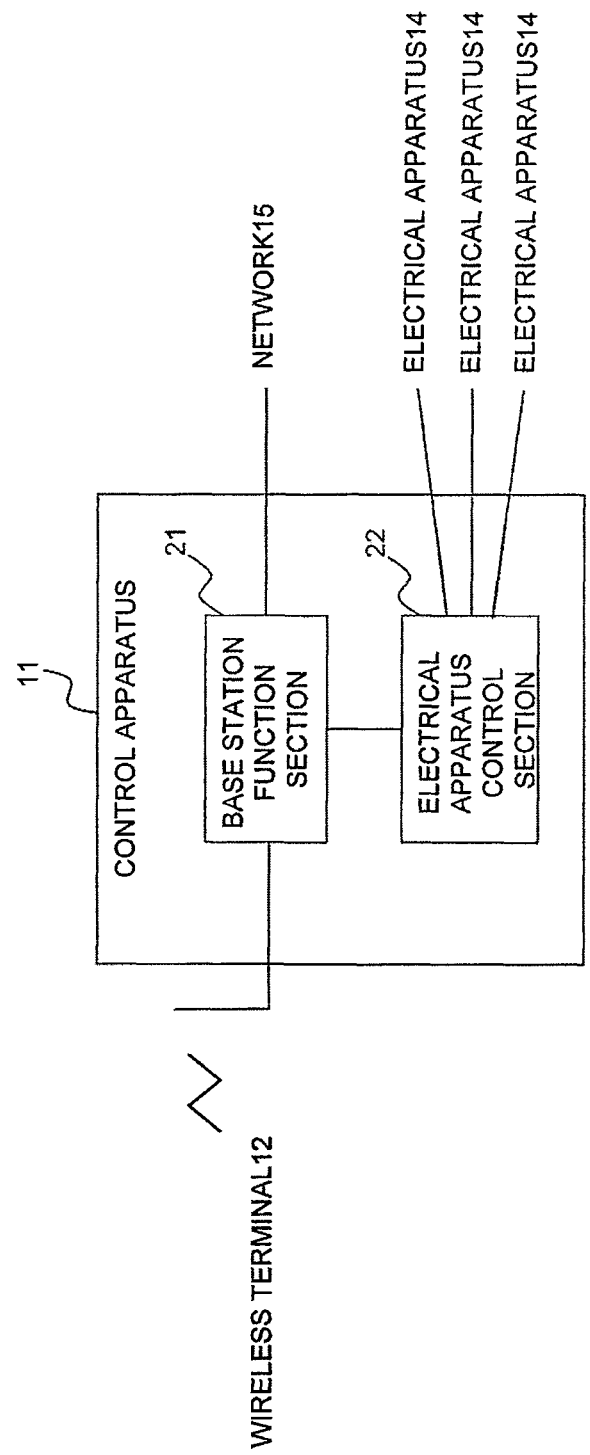
FIG. 3 is a block diagram showing a basic configuration of control apparatus 11 of this exemplary embodiment.

FIG. 3 is a block diagram showing the basic configuration of control apparatus 11 of this exemplary embodiment. Referring to FIG. 3, control apparatus 11 includes base station function section 21 and electrical apparatus control section 22.

Base station function section 21 functions as a small-sized wireless communication base station and connects to wireless terminal 12. Then, base station function section 21 performs relay when connected wireless terminal 12 acquires target apparatus data including the list of control target electrical apparatuses set for control apparatus 11, from server 13.

Electrical apparatus control section 22 receives operation data for controlling the control target electrical apparatus included in the list, from wireless terminal 12, and controls the control target electrical apparatus on the basis of the operation data. Furthermore, electrical apparatus control section 22 may transmit the operation data received from wireless terminal 12, to server 13.

Figure 4:
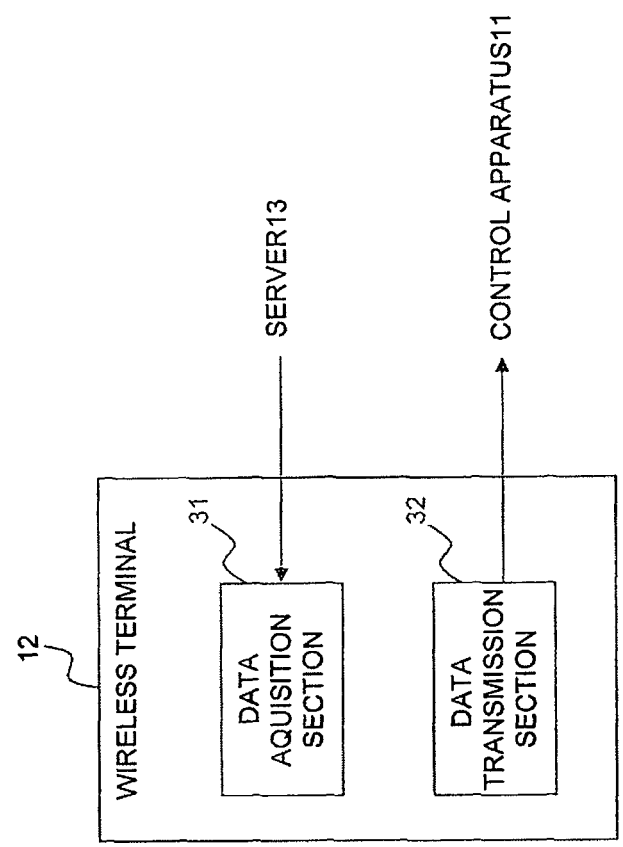
FIG. 4 is a block diagram showing a basic configuration of wireless terminal 12 of this exemplary embodiment.

FIG. 4 is a block diagram showing the basic configuration of wireless terminal 12 of this exemplary embodiment. Referring to FIG. 4, wireless terminal 12 includes data acquisition section 31 and data transmission section 32.

Recognizing control apparatus 11 as a small sized base station and which is provided with both a function to control a control target electrical apparatus and a function to act as a small-sized wireless communication base station, as a small-sized base station, data acquisition section 31 wirelessly connects thereto and acquires target apparatus data including a list of control target electrical apparatuses set for control apparatus 11, from server 13 via control apparatus 11.

Data transmission section 32 transmits operation data for controlling a control target electrical apparatus included in the list to control apparatus 11 on the basis of an operation performed by the user.

Control apparatus 11 of this exemplary embodiment may be provided with a further extended or altered configuration.

Figure 5:
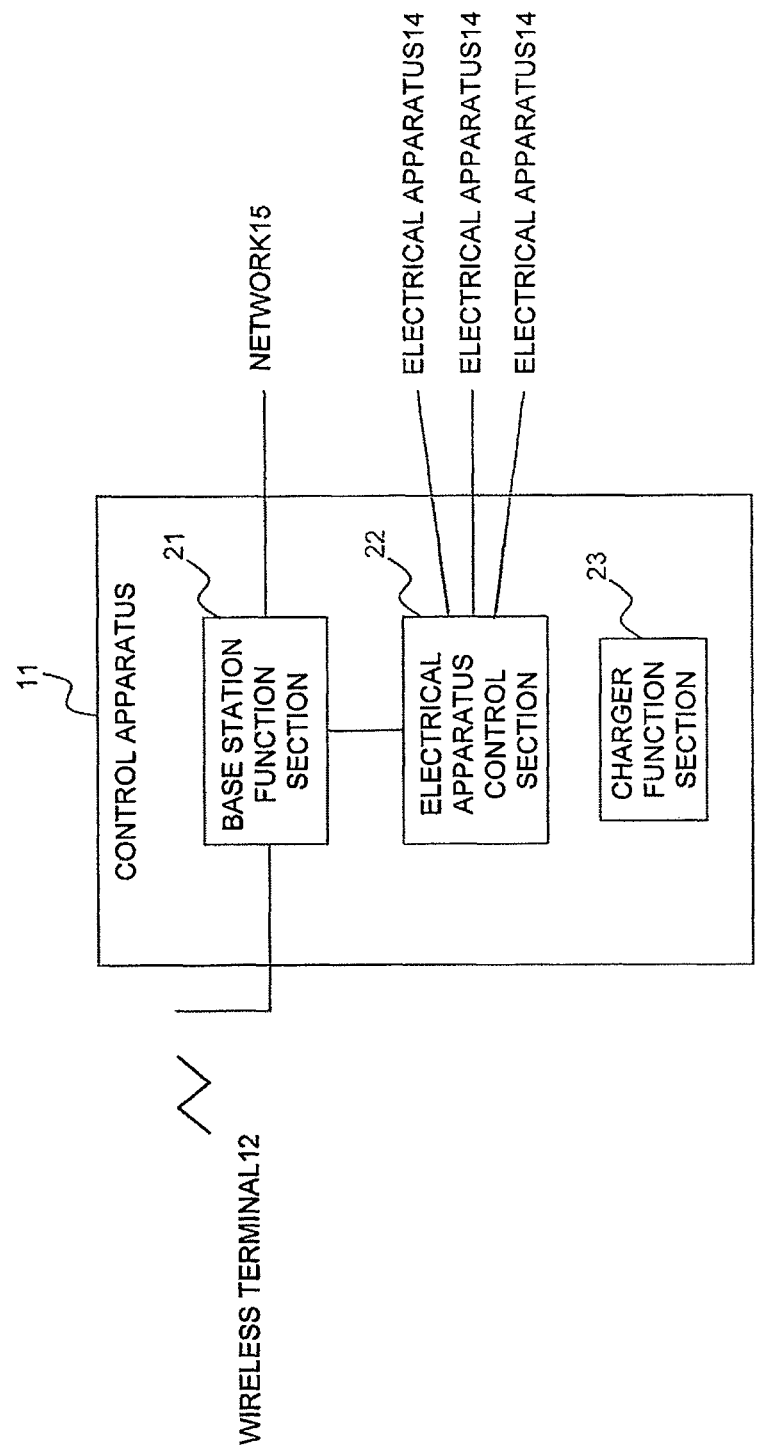
FIG. 5 is a block diagram showing a configuration of control apparatus 11 of a variation example.

FIG. 5 is a block diagram showing the configuration of control apparatus 11 of a variation example. Referring to FIG. 5, control apparatus 11 of the variation example is such that charger function section 23 is added to control apparatus 11 with the basic configuration shown in FIG. 3.

Charger function section 23 functions as a charger for charging wireless terminal 12. Since wireless terminal 12 can maintain a good wireless environment between wireless terminal 12 and control apparatus 11 while wireless terminal 12 is being charged, it is possible to control electrical apparatus 14 by wireless terminal 12 during charging.

Figure 6:
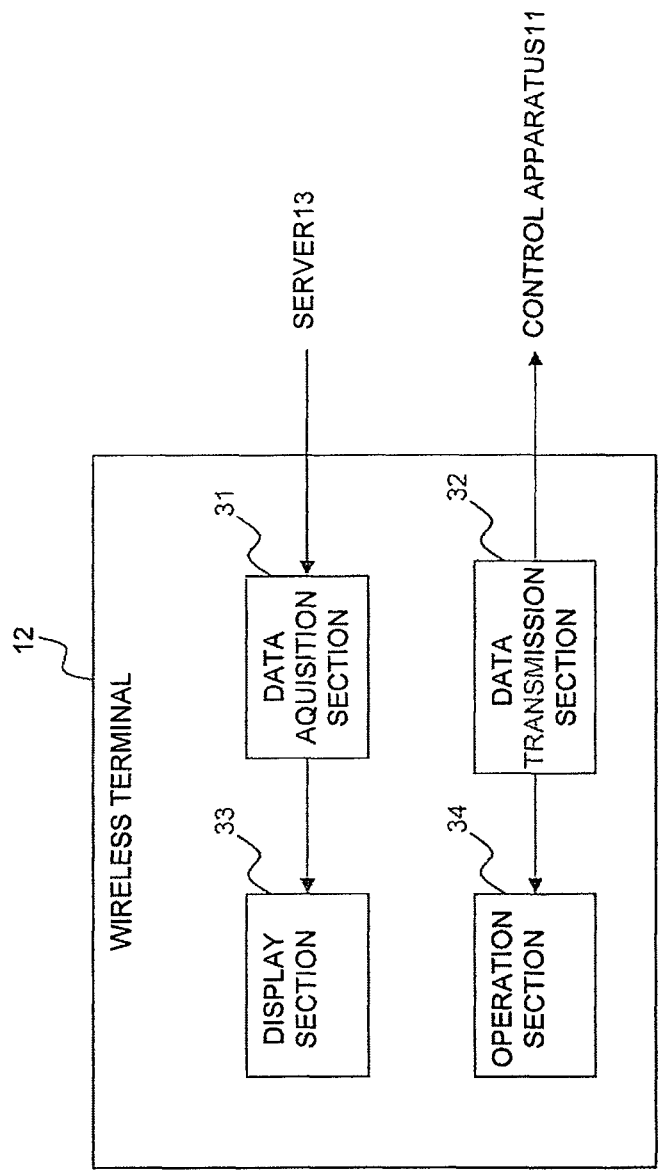
FIG. 6 is a block diagram showing a configuration of wireless terminal 12 of the variation example.

FIG. 6 is a block diagram showing a configuration of wireless terminal 12 of the variation example. Referring to FIG. 6, wireless terminal 12 of the variation example is such that display section 33 and operation section 34 are added to wireless terminal 12 with the basic configuration shown in FIG. 4.

Display section 33 is a display which displays target apparatus data acquired by data acquisition section 31. Operation section 34 is an operation section which accepts an operation by the user. Display section 33 and operation section 34 may be separately provided or may be integrally configured as a touch panel type display.

A more specific configuration example will be described below.

Figure 7:
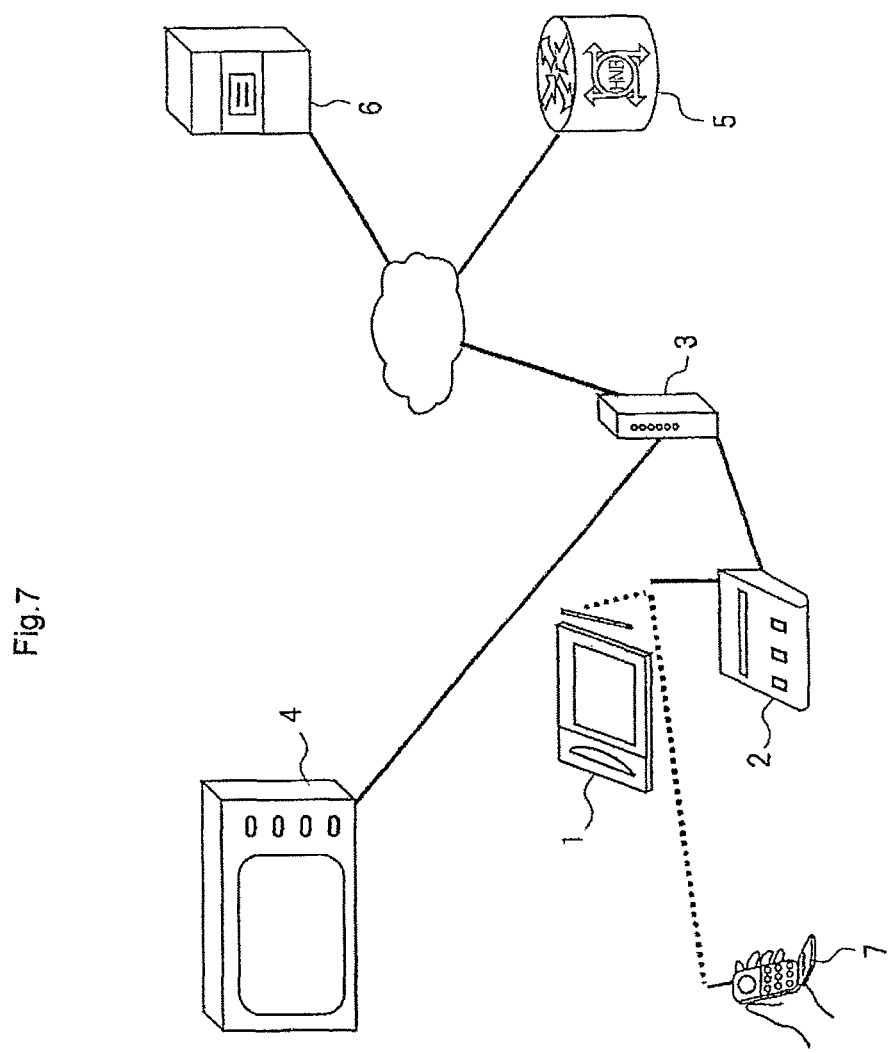
FIG. 7 is a block diagram showing a configuration of an electrical apparatus control system of this specific example.

FIG. 7 is a block diagram showing a configuration of an electrical apparatus control system of this specific example. Referring to FIG. 7, the electrical apparatus control system includes small-sized general-purpose terminal 1, small-sized apparatus 2 and data server 6.

Small-sized apparatus 2 is a small-sized stationary-type apparatus which includes a small-sized base station (femtocell) which transmits and receives wireless radio waves and on which small-sized general-purpose terminal 1 can be put. Small-sized apparatus 2 also has a network transmission function and is connected to router 3 via a network transmission cable. It can connect to a network such as the Internet via router 3. To the network, data server 6 described above and mobile communication core network 5 are connected. It is preferable that small-sized apparatus 2 has a function of charging small-sized general-purpose terminal 1 put thereon.

Small-sized general-purpose terminal 1 can be put on small-sized apparatus 2, and it is a portable type terminal apparatus capable of wirelessly connecting to small-sized apparatus 2 which functions as a small-sized base station. Common mobile communication mobile phone 7 can also wirelessly connect to small-sized apparatus 2 functioning as a small-sized base station. Mobile phone 7 is capable of connecting to core network 5 via small-sized apparatus 2 to perform communication such as voice communication and packet communication. Thereby, it is possible to use mobile phone 7 in a reliable radio wave environment in a user's house. Core network 5 is a mobile communication core network which includes mobile phone 7 and is connected to a network such as the Internet.

Small-sized general-purpose terminal 1 has, for example, input and output functions, such as a display and a touch panel, a function of transmitting and receiving radio waves to and from small-sized apparatus 2, a function of transmitting and receiving operation data and use records of electrical appliances 4 via small-sized apparatus 2, a function of storing received data and a function of controlling electrical appliances 4 and the like used in the user's house via small-sized apparatus 2. It is preferable that small-sized general-purpose terminal 1 can be charged from small-sized apparatus 2. It is also preferable that small-sized general-purpose terminal 1 can be operated by inputting voice.

Data server 6 is connected to a network, and it transmits and receives data to and from small-sized general-purpose terminal 1 via the network. Data server 6 is provided with a storing function for storing data, and it stores, for each small-sized apparatus 2, target apparatus data including information about control target electrical appliances 4 and use records received from small-sized apparatus 2, the use records being based on the operations of small-sized general-purpose terminal 1.

As the first operation, small-sized general-purpose terminal 1 wirelessly connects to small-sized apparatus 2 first. When being connected to small-sized apparatus 2, small-sized general-purpose terminal 1 takes out use records and a list of control target electrical appliances 4 from data server 6.

In this case, data server 6 or small-sized general-purpose terminal 1 may propose usage to the user with reference to additional information such as time information. For example, the set temperature of an air conditioner frequently used in the past may be proposed.

For example, data server 6 accumulates use records for each small-sized apparatus 2 on the basis of operation data notified by small-sized apparatus 2. Data server 6 may notify small-sized general-purpose terminal 1 of the use records so that small-sized general-purpose terminal 1 may determine the usage to be proposed to the user, on the basis of the use records.

Otherwise, data server 6 may determine the usage to be proposed to the user on the basis of the use records for each small-sized apparatus 2 and notify small-sized general-purpose terminal 1 of it. Data server 6 may periodically transmit information about proposed usage to small-sized general-purpose terminal 1 and transmit it to small-sized general-purpose terminal 1 together with use records and a list of electrical appliances 4.

Then, operation data is transmitted from small-sized general-purpose terminal 1 to electrical appliance 4 via small-sized apparatus 2 via wireless communication between small-sized general-purpose terminal 1 and small-sized apparatus 2 to execute a control command. The operation data for the control command is notified to data server 6 from small-sized apparatus 2.

Figure 8:
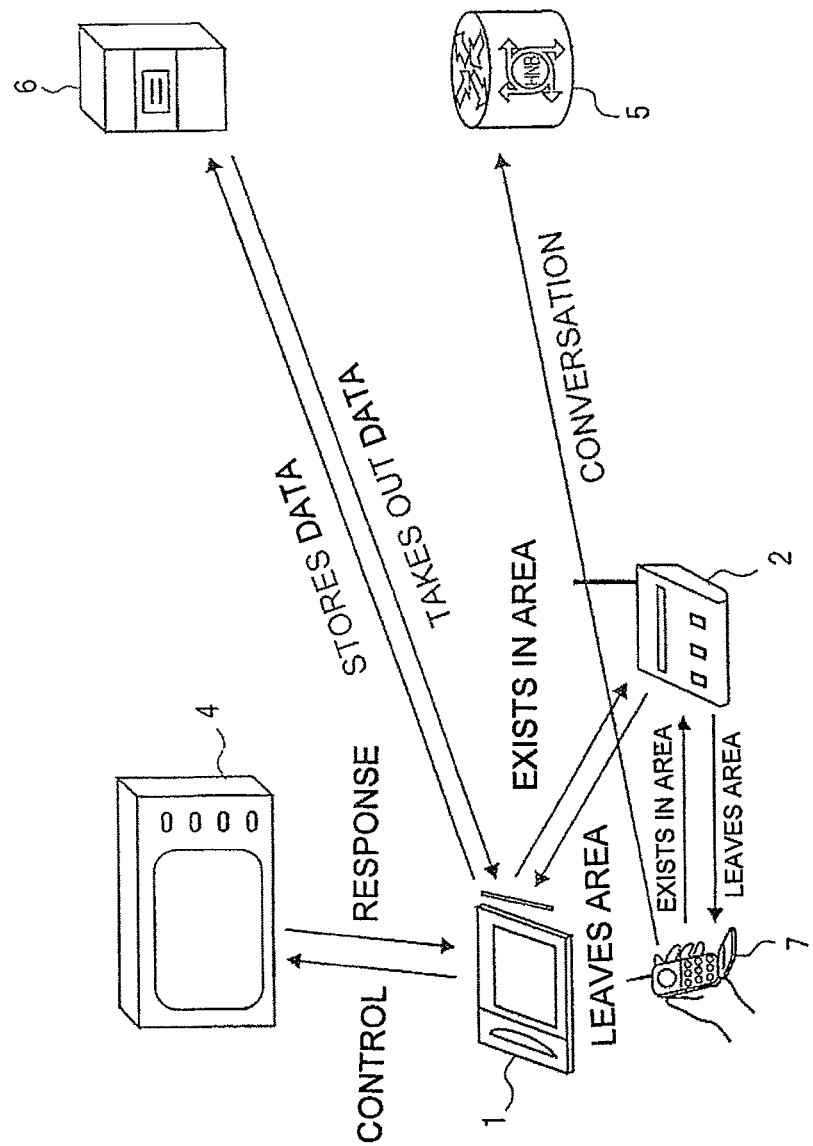
FIG. 8 is a diagram for illustrating the state of use of the electrical apparatus control system in this specific example.

FIG. 8 is a diagram for illustrating the state of use of the electrical apparatus control system in this specific example.

First, when existing in the area of small-sized apparatus 2, small-sized general-purpose terminal 1 connects to small-sized apparatus 2 and executes a process of drawing various data from data server 6. Then, small-sized general-purpose terminal 1 displays an operation screen prompting the user to perform an operation on the basis of target apparatus data which has been drawn. Specifically, an operation menu can be displayed on the screen. When a selection operation is performed, the screen display may be switched in accordance with the selection operation.

Small-sized general-purpose terminal 1 may analyze the operation tendency in the past on the basis of the past operation data (use records) which have been drawn and display the result on the operation screen. The past setting that has been frequently used can be clearly shown, and the past setting can be displayed in a manner in which the user can easily select it.

When the user actually operates small-sized general-purpose terminal 1, operation data showing the contents of the operation is notified to electrical appliance 4 from small-sized apparatus 2, and electrical appliance 4 responds to it. The operation data is also acquired as a log at small-sized apparatus 2, notified to data server 6 and accumulated as use records for each small-sized apparatus 2. Alternatively, small-sized apparatus 2 itself may accumulate the operation data as use records.

It is also possible for small-sized apparatus 2 to cause mobile phone 7 of public mobile communication to exist in its area. When existing in the area of small-sized apparatus 2, mobile phone 7 can connect to small-sized apparatus 2 and perform communication such as voice communication and packet communication via small-sized apparatus 2. Communication data in this case may be also acquired as a log at small-sized apparatus 2 and notified to data server 6. Alternatively, small-sized apparatus 2 itself may accumulate the communication data as a log.

The operation data or communication data acquired as a log at small-sized apparatus 2 is accumulated for each small-sized apparatus 2 at small-sized apparatus 2 or data server 6. Even if multiple small-sized general-purpose terminals 1 are connected to small-sized apparatus 2 at the same time or at separate times, logs are accumulated not for each small-sized general-purpose terminal 1 but for each small-sized apparatus 2.

According to this specific example, by putting general-purpose small-sized general-purpose terminal 1 that is capable of controlling electrical appliances 4 in a home on small-sized apparatus 2 which includes a small-sized base station, it is possible to control electrical appliances 4 in a reliable radio wave condition even if small-sized general-purpose terminal 1 is used in a weak electric zone for mobile communication, such as the inside of a home.

Since the place where small-sized general-purpose terminal 1 is used (for example, a home) can be identified by small-sized apparatus 2, it is possible to provide the same operability to persons staying at the place (for example, a family) by accumulating data, such as use records, for each small-sized apparatus 2.

Data server 6 may accumulate data, such as use records, for each home identified by small-sized apparatus 2, perform correction and statistical processing of the data and propose usage to each home that is determined by taking into consideration usage in the homes of others. In such a case, it is possible to propose usage determined by performing statistical processing for each region, for each home in the region.

In this specific example, since the place where control target electrical appliance 4 is installed is identified for each small-sized apparatus 2, control functions applicable at each place may be specified for each place. For example, certain small-sized apparatus 2 may be adapted to be capable of timer-controlling electrical appliance 4, and small-sized apparatus 2 at a certain place may be adapted to be capable of controlling electrical appliance 4 only on a real-time basis. In such a case, information showing control functions applicable at the home can be included in target apparatus data provided from data server 6 to small-sized general-purpose terminal 1. Small-sized general-purpose terminal 1 can display the applicable control functions and accept the control functions in response to a user operation.

In this specific example, the main installation place of small-sized apparatus 2 is assumed to be the inside of a user's house. However, the present invention is not limited thereto, and small-sized apparatus 2 may be installed outdoors.

The installation place of small-sized apparatus 2 is not limited to a private house but may be public facilities such as a public office and a post office. In such a case, control targets may not be electrical appliances 4 but may be various kinds of electrical apparatuses used in the public facilities.

Since small-sized apparatus 2 is basically fixedly installed and is assumed not to move, it is possible to identify position information or facilities information from information about the place or the like of a router to which small-sized apparatus 2 is connected. These position information and facilities information may be managed via core network 5.

Data server 6 notifies small-sized general-purpose terminal 1 existing in the area of small-sized apparatus 2 installed in a public facility of electrical apparatuses which are specific to the public facility and which are installed in the public facility, as control targets.

Multiple small-sized general-purpose terminals 1 may simultaneously exist for one small-sized apparatus 2. In such a case, small-sized apparatus 2 performs exclusion processing so that electrical appliance 4 that is being controlled from certain small-sized general-purpose terminal 1 cannot be controlled from other small-sized general-purpose terminals 1. Specifically, for example, when receiving operation data for electrical appliance 4 being controlled from certain small-sized general-purpose terminal 1, from another small-sized general-purpose terminal 1, small-sized apparatus 2 can invalidate the operation data.

It is also possible to connect multiple small-sized apparatuses 2 to one data server 6, and the number of small-sized apparatuses 2 is not especially limited. It is also possible to connect multiple small-sized apparatuses 2 to one core network 5, and the number of small-sized apparatuses 2 is also not especially limited.

Since target apparatus data and operation data depend on control target electrical appliance 4, it is preferable that the data length and data classification of these data which are transmitted and received between small-sized general-purpose terminal 1 and data server 6 be variable.

Data server 6 may distribute advertisements and other contents determined by statistical processing and the like using data accumulated for each small-sized apparatus 2, to small-sized apparatus 2 installed in each of the homes or the like.

Exemplary embodiments have been described above. The present invention is not limited to these exemplary embodiments. These exemplary embodiments may be used in combination or a part of the configuration may be changed, within the range not departing from the technical idea of the present invention.

What is claimed is:

1. An electrical apparatus control system comprising:
   a control apparatus connected to a control target electrical apparatus configured to function as a small-sized wireless communication base station that relays wireless communication;
   a wireless terminal configured to wirelessly connect to said control apparatus; and
   a server configured to hold target apparatus data including a list of control target electrical apparatuses set for each control apparatus;
   wherein:
   said wireless terminal acquires the target apparatus data set for said control apparatus from said server by using the wireless communication relayed via said control apparatus, and transmits operation data, for controlling the control target electrical apparatus included in the list, to said control apparatus based on a performed operation;
   said control apparatus relays the wireless communication that the wireless terminal uses to acquire the target apparatus data set from the server;
   said control apparatus controls the control target electrical apparatus on the basis of the operation data received from said wireless terminal;
   said control apparatus transmits the operation data received from said wireless terminal to said server; and
   said server accumulates the received operation data, associating the operation data with said control apparatus.

2. The electrical apparatus control system according to claim 1, wherein said server transmits, together with the list of control target electrical apparatuses set for said control apparatus, assistance data for assisting a user who operates the control target electrical apparatus included in the list of control target electrical apparatuses, the assistance data being determined on the basis of the accumulated operation data associated with said control apparatus, by including the assistance data in the target apparatus data, to the wireless terminal.

3. A control apparatus configured to function as a small-sized wireless communication base station connected to a control target electrical apparatus, the control apparatus comprising:
   a base station function section that relays wireless communication when a wireless terminal acquires from a server, by using the wireless communication, target apparatus data including a list of control target electrical apparatuses set for the control apparatus; and
   an electrical apparatus control section configured to receive from the wireless terminal operation data for controlling a control target electrical apparatus included in the list;

wherein:
said control apparatus relays the wireless communication that the wireless terminal uses to acquire the target apparatus data from the server;
said control apparatus controls the control target electrical apparatus on the basis of the operation data;
said control apparatus transmits the operation data received from said wireless terminal to said server; and
said server accumulates the received operation data, associating the operation data with said control apparatus.

4. The control apparatus according to claim 3, wherein said electrical apparatus control section transmits the operation data received from the wireless terminal, to the server.

5. The control apparatus according to claim 3 further comprising a charger function section configured to charge the wireless terminal.

6. A wireless terminal comprising:
a data acquisition section configured to wirelessly connect to a control apparatus provided with a control function for controlling a control target electrical apparatus and a function to act as a small-sized wireless communication base station that relays wireless communication and acquires target apparatus data including a list of control target electrical apparatuses set for the control apparatus, from a server by using the wireless communication relayed via the control apparatus; and
a data transmission section configured to transmit operation data for controlling the control target electrical apparatus included in the list to the control apparatus via the wireless communication, based on a performed operation;
wherein:
said control apparatus transmits the operation data received from said wireless terminal to said server; and
said server accumulates the received operation data, associating the operation data with said control apparatus.

7. The wireless terminal according to claim 6, further comprising a display section configured to display a screen for operating the control target electrical apparatus included in the list.

* * * * *